United States Patent [19]
Kreft

[11] Patent Number: 5,619,683
[45] Date of Patent: Apr. 8, 1997

[54] REFERENCE INTERNATIONAL CARD HARMONIZATION COUPLER

[75] Inventor: Hans-Diedrich Kreft, Dassendorf, Germany

[73] Assignee: Angewandte Digital Electronik, Dassendorf, Germany

[21] Appl. No.: 242,112

[22] Filed: May 13, 1994

[30] Foreign Application Priority Data

May 13, 1993 [EP] European Pat. Off. ............. 93107810

[51] Int. Cl.⁶ ............................. G06F 15/30; G07F 19/00
[52] U.S. Cl. ............................. 395/500; 395/280; 902/26; 902/39
[58] Field of Search ..................... 395/325, 500; 235/380; 902/26, 39; 364/408

[56] References Cited

U.S. PATENT DOCUMENTS

| | | |
|---|---|---|
| 4,390,964 | 6/1983 | Horky et al. |
| 5,021,991 | 6/1991 | MacGregor et al. ............ 364/900 |
| 5,036,461 | 7/1991 | Elliott et al. ............... 364/408 |
| 5,149,945 | 9/1992 | Johnson et al. |
| 5,179,648 | 1/1993 | Hauck ....................... 395/145 |

FOREIGN PATENT DOCUMENTS

| | | |
|---|---|---|
| 0385022 | 9/1990 | European Pat. Off. |
| WO87/07062 | 11/1987 | WIPO |

Primary Examiner—Jack B. Harvey
Assistant Examiner—Jeffrey K. Seto
Attorney, Agent, or Firm—Hill, Steadman & Simpson

[57] ABSTRACT

A hardware device known as a RICH coupler which works between an IC card and its corresponding terminal system. The function of the RICH coupler depends upon its position. Between the card level and the system level there is a third independent level, the coupler. The card level and the system level are involved in the specific card application. The coupler level is application independent. The present invention provides an application independent RICH coupler which works like a supervisor between the applications on the card level and the applications on the system level.

19 Claims, 4 Drawing Sheets

REFERENCE INTERNATIONAL CARD HARMONIZATION COUPLER

BACKGROUND OF THE INVENTION

1. Field of the Invention

The present invention relates generally to integrated circuit(s) cards (IC cards) and card terminals, and more specifically to IC cards, terminals and communication standards between cards and terminals as described in the ISO 7816 for cards with contacts, in the ISO 10 536 for contactless cards and in the EN 726 for cards and terminals for telecommunication use.

2. Description of the Related Art

It is possible to load data for many different card applications (CA1, CA2, CA3, etc.) (see FIGS. 1,2) of different application providers (AP1, AP2, AP3, etc.)like banks, dealer organizations, clubs, telephone companies, insurance companies, special service providers, etc. into the memory of an IC card. Such cards are known as multiapplication cards (MACs).

It is obvious that a MAC provides the opportunity to combine the benefits of many different application providers onto one card. The combination of two application providers on a known magnetic stripe card is commonly called "co-branding". There are many different co-branding cards in today's market.

However, the possibilities of a MAC greatly exceed the limits of a co-branding card, i.e. the multitude of possibilities of combining the benefits of different application providers on one MAC. Because of this, pools of MAC providers could be established. For example, a phone company could combine its phone service with the benefits of a bank. The memory of the same card could also be used for an insurance company. In addition, a credit card organization could combine its card with the benefits of a travel agency and further add the benefits of a club to the card. Also, the unfilled memory on the card could still provide the benefits of a retail and department store. For MAC provider pools, it would be advantageous to quickly penetrate the market and thereby reserve a substantial market share by issuing many cards in a short time to a great number of consumers. Because of this advantage, different MAC provider pools would spread out into the marketplace.

However, this situation is problematic for the card user. First, if the user chooses one card, the user then has to do without the benefit of the other MAC. If the user desires the benefits of more than one card, the troubles of using many cards arise. A main problem is having to carry several different cards with different applications and service benefits. Thus, the advantages of carrying only one MAC which serves all the different benefits of the various cards is not achieved.

As a result, a customer who has to choose between many different, but more narrowed MAC services, needs a longer decision time to select the best MAC. Thus, the total MAC market penetration would require a longer time to mature. The return of investment for a card issuer is thereby delayed.

It is known that a market for a unique product is often a fast growing market. For example, one of the most successful recent market penetrations occurred with the digital music disc. One of the most helpful effects was the international technical standard providing a compatible technique for compatible disc players. At least in part, the overwhelming success of the compact disc was due to a compatible standard in the industry.

To further understand the field, a quick summary of MACs follows. Certain types of MACs exist at present. For example, if a card holder can use the MAC only within a specified MAC provider pool, the MAC is known as a closed MAC (CMAC). A CMAC is characterized by the allowing only card applications of the specific provider pool and excluding applications of other providers, especially competing MAC providers.

In opposition to the concept of the CMAC is a MAC which is open to all the different applications of different providers. Such a MAC is known as an open MAC (OMAC). An OMAC allows the card holder the possibility of selecting the application or provider to use with the MAC. Thus, the user needs to carry only one OMAC instead of many different cards with different services.

As a result of the international distribution of MACs comes the requirement for a standardized reference system which decides whether a MAC or a MAC terminal meets the standards and will communicate in a specified manner. OMACs particularly need a standardized reference to make sure that different applications of different providers work together without interfering with the different data stored in the MAC.

Such attempts for standardization of IC cards have led to many results which are described in the papers of the ISO/IEC/JTCl/SC17, the CEN/TC224 and the ETSI. There are several reasons why these papers do not guaranty that different issued MACs could be used at any terminal in a predictable manner.

One reason for possible incompatibility is that some of the papers describe optional solutions. Thus, there could be IC-cards issued to a user with different physical conditions or data structures. Also there could be terminals with different protocol structures installed. The result is that cards and terminals cannot work together in a determined manner.

Another reason for incompatibility is possible misinterpretation in reading the ISO papers. The misinterpretation by designers could result in different hardware layouts and different written programs on both the card level and the system level.

A third reason for incompatibility is the possibility of the ISO papers containing some inconsistencies which could lead to inconsistencies in the developed hardware and software. If the inconsistencies become obvious, developers may circumvent the inconsistencies in different ways. It is obvious that in both cases inconsistencies could result in incompatibility.

In all three mentioned cases, the issuer of cards and/or terminals may maintain that their products are ISO-compatible. Thus, there is no reliability that the interaction between card and terminal would work in a determined process in accordance with the intention of the ISO-standardization.

Today, no other reference exists other than the descriptions of the ISO, etc. There is no reference-process or reference-system by which it could be decided in a determined objective manner whether a card and/or terminal operates in a compatible manner.

SUMMARY OF THE INVENTION

It is an object of the present invention to adapt the international standards of IC cards to work for MACs.

It is another object of the present invention to provide an application independent RICH coupler which works like a supervisor between the applications on the card level and the applications on the system level.

This invention further provides an embodiment having a computer aided system to assure that MACs communicate with terminals in a determined manner in relation to international and European standardization.

Figure 1:
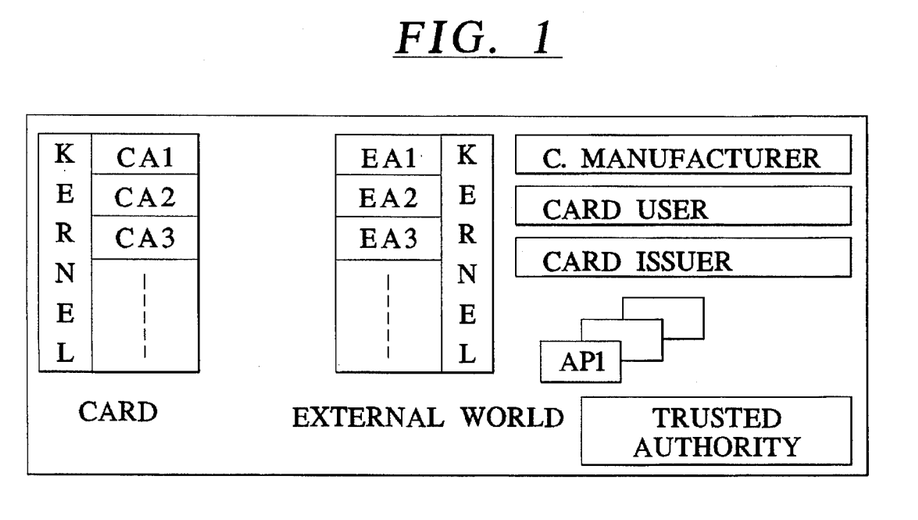
FIG. 1 illustrates a reference model for a card system of the present invention.

To this end, a hardware device known as a Reference International Card Harmonization coupler is described herein which works like a supervisor between a card and an associated terminal. The supervisory function of the RICH coupler depends on its position, for example as illustrated in FIGS. 1,2,3 and 4. FIG. 1 which is the standard model of ISO-standardization description. The assumption of international standardization is that if on the side of the card there exists a standardization and also on the side of the external world, then both sides would work faultlessly together.

Figure 3:
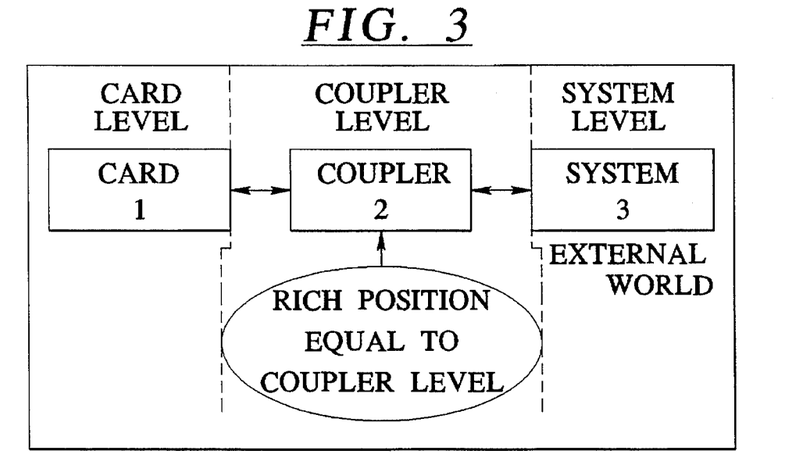
FIG. 3 illustrates a model of the present invention.

As illustrated in FIG. 3, it is obvious that between the card level and the system level there is a third independent level, the coupler level. The card level and the system level are involved in the specific card application. The coupler level is application independent. It operates as a supervisor of all the processes and interactions that take place on the coupler level.

DETAILED DESCRIPTION OF THE PREFERRED EMBODIMENTS

FIG. 1 is identical to FIG. 3 found in the description EN 726-1 entitled "Terminal Equipment (TE) Requirements for IC cards and terminals for telecommunication use Part 1—System overview", item 5, general concepts. The FIG. 3 of EN 726-1 shows a reference model for a card system. This reference model distinguishes between the two separate parts, the card and the external world. The abbreviations used are as follows: Card applications: CA1, CA2, CA3, etc.; External applications: EA1, EA2, EA3, etc.; and Application providers: AP1, AP2, AP3, etc.

It is obvious that there has to be a direct physical connection for establishing a bidirectional signal flow for communications between the card on one side and the external world on the other side. The fundamental assumption of the different standardization papers is that a description of the card on one side and a description of the external world on the other side could determine compatibility between both sides. The remaining problem is to make sure that different cards and the external world are able to couple in a foreseen and standard conforming manner.

Figure 2:
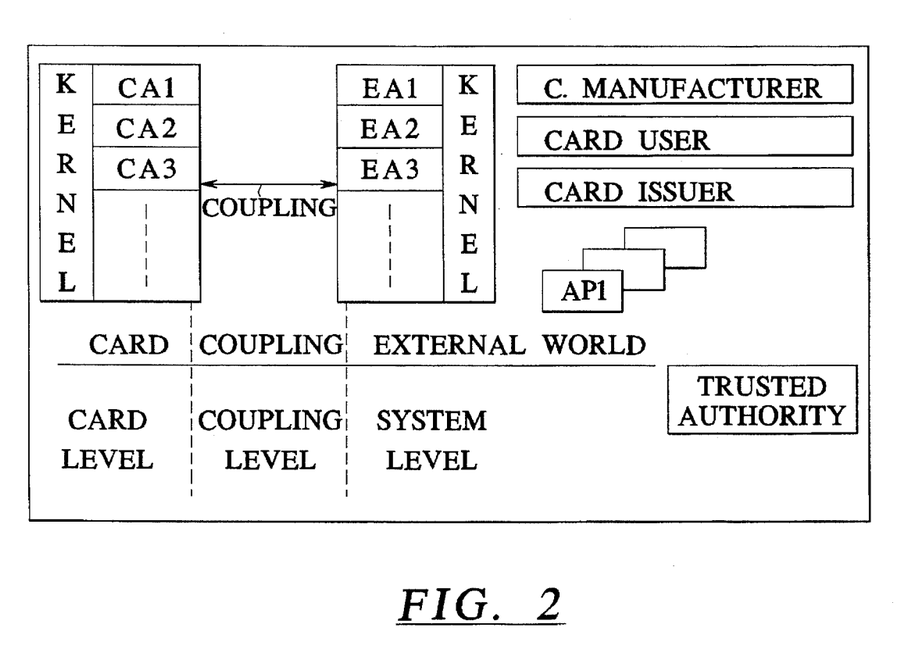
FIG. 2 illustrates the direct physical connection for establishing bi-directional signal flow for communications as shown in FIG. 1 in the present invention.

FIG. 2 is identical to FIG. 1 with the addition of the word "COUPLING" and the symbol ⇆ which symbolize the direct physical connection for establishing a bidirectional signal flow for communication use between the card at one side and the external world at the other side. FIG. 2 also shows that the card, coupling and external world are related to the card level, coupler level and system level as defined herein.

FIG. 3 is a RICH level model. The RICH level model shows the three elements; card 1, coupler 2 and system 3. These three elements are assigned to three levels: card level, coupler level and system level. The symbols ⇆ shows that they belong to the coupler level. FIG. 3 shows that the RICH position is equal to the coupler level. It is further indicated that the external world operates on the system level.

Figure 4:
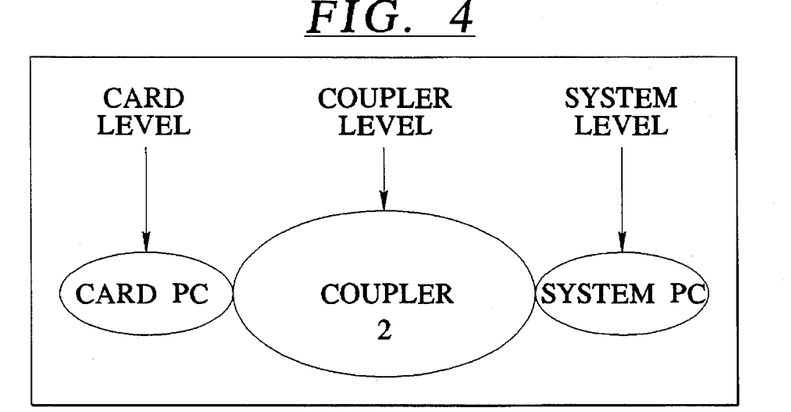
FIG. 4 illustrates a PC solution for the present invention.

FIG. 4 is a RICH PC solution and shows one of the main goals of this description of RICH. At the card level, a card could be substituted by a card PC which simulates the card 1. At the system level, the external world could be simulated by a system PC. If the card PC and the system PC could interact in a determined and foreseen manner by using the coupler 2, then this coupler is a reference for the correct coupling and interaction between the card level and the system level. Such a coupling is named RICH coupling.

Figure 5:
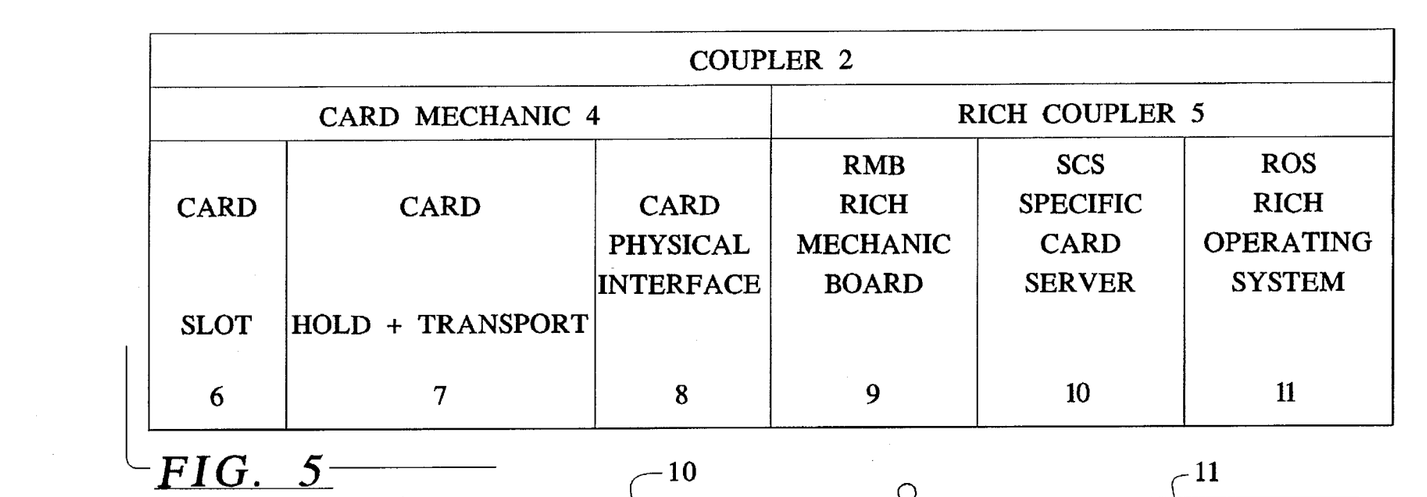
FIG. 5 illustrates the elements of the present invention.

FIG. 5 illustrates the coupler 2 and symbolizes the different parts of the coupler 2. The coupler 2 consists of two main parts, a card mechanic 4 and a RICH coupler 5. The first main part, the card mechanic 4, consists of mechanical parts like a card slot 6, a card hold and transport 7 and a card physical interface 8. The card mechanic 4 is not a goal of the detailed description of RICH. It is mentioned for completion of the RICH description.

A card slot 6 is a mechanical device in which a card could be inserted. The mechanical card hold and transport 7 positions the card in a determined geometrical relation to the other parts of the card mechanic 4.

The card physical interface 8 is embodied by physical elements like contacts, coils, capacitors for providing the electrical and communication interaction to the real cards. A coupler which performs RICH requirements distinguishes not between the different cards, i.e., cards with contacts and contactless cards, but for RICH, it is only necessary that the card mechanic serves the electrical and communication interaction to the different types of cards.

The second main part, the RICH coupler 5, consists of the RICH mechanic board (RMB) 9, the specific card server (SCS) 10, and the RICH operating system (ROS) 11. These three parts are the important parts of RICH and are described in detail.

Figure 6:
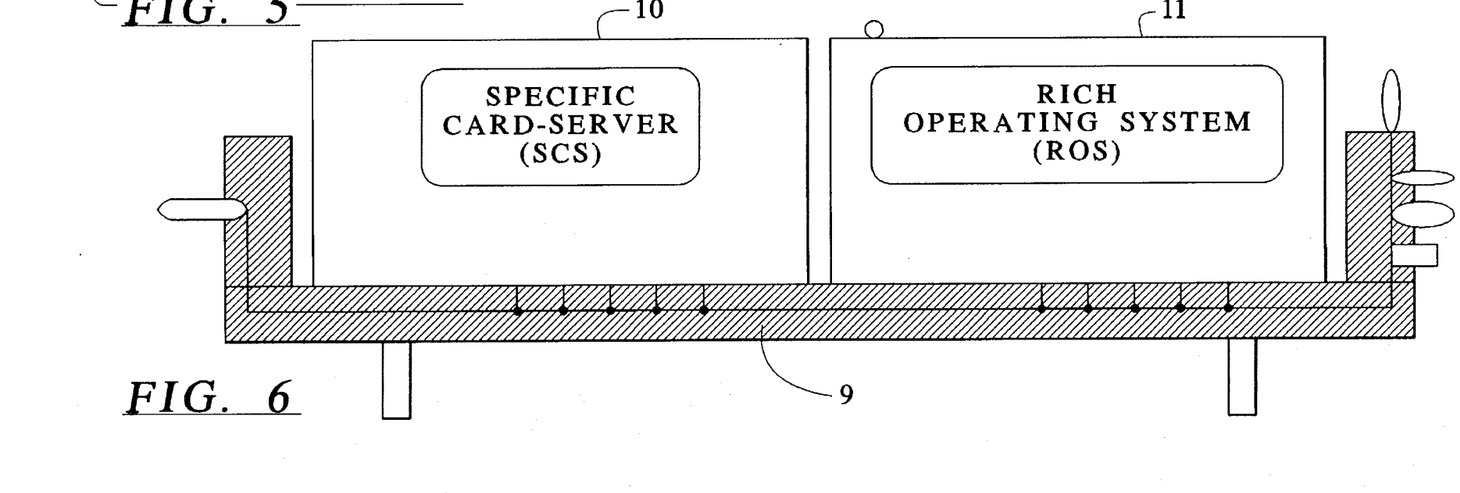
FIG. 6 illustrates an embodiment of the RICH coupler of the present invention.

FIG. 6 is the RICH coupler 5 and shows a complete performance of a RICH coupler 5 with the three parts: RICH mechanic board (RMB) 9, specific card server (SCS) 10 and the RICH operating system (ROS) 11.

Figure 7:
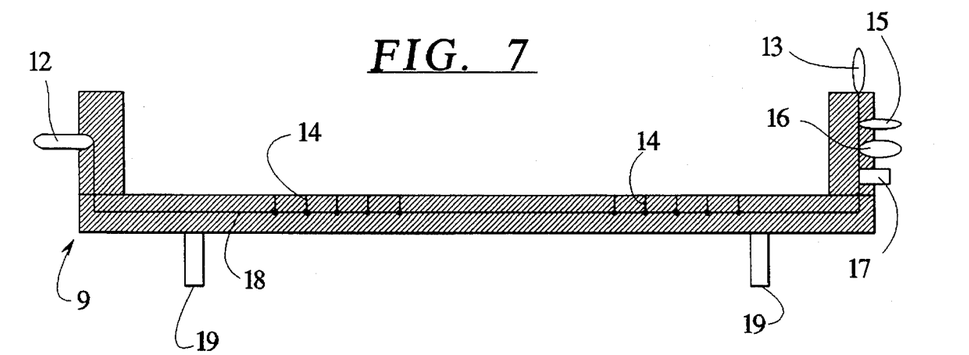
FIG. 7 illustrates an embodiment of a RICH mechanic board of the present invention.

FIG. 7 is the RICH mechanic board (RMB) 9 and shows in detail a mechanical performance of the RMB 9. The RMB 9 is a mechanical part—like a printed wiring board—which has ROS and SCS connection holes 14 for mounting the two electronic circuits ROS and SCS, respectively. Therefore, the RMB contains standardized connections which electrically connect the elements SCS 10 and ROS 11 and mechanically hold them. The RMB 9 has the RICH mechanic plug 12, RICH system plug 13, the ROS and SCS connection holes 14, RICH test plug 15, RICH data plug 16, RICH power plug 17, RMB connection wires 18 and the RICH mechanical connection elements 19.

The RMB connection wires 18 are electrical wires embedded in the material of the RMB 9 and connect the different elements of the RMB 9 electrically. The wire-connection is a predetermined network for all uses of the RMB 9 and makes sure that the electrical and communication connections to the card level and the system level are always determined. The RICH mechanical connection elements 19 are prepared for the mounting of the RMB 9 to an external mechanic device.

Figure 8:
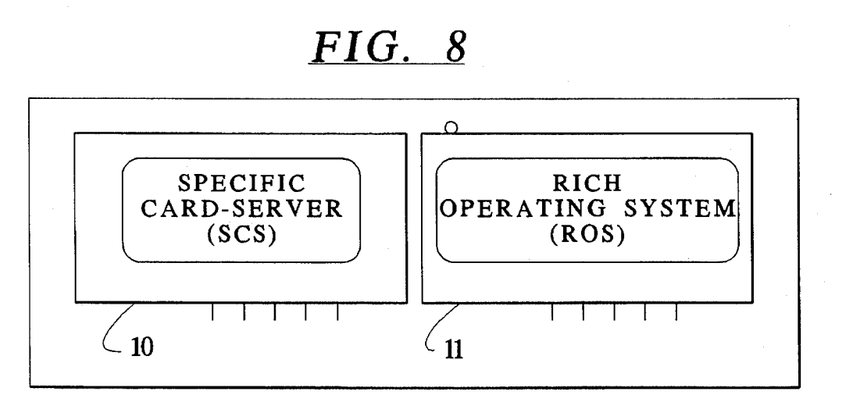
FIG. 8 illustrates a specific card server and an operating system for the present invention.
Figure 9:
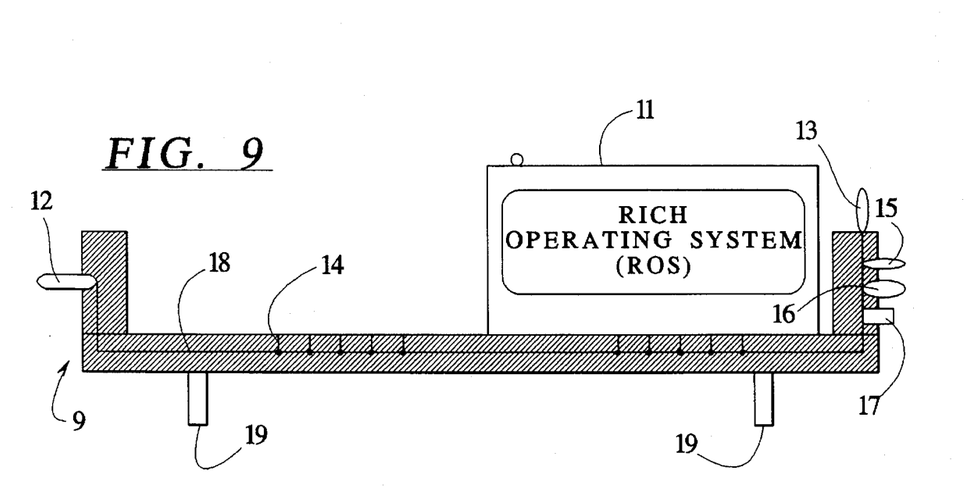
FIG. 9 illustrates a RICH mechanic board of FIG. 7 incorporating an operating system of FIG. 8 of the present invention.

FIG. 8 shows the separated devices SCS 10 and ROS 11 which could be mounted at the RMB 9. Also, FIG. 9 shows the RICH coupler 5, which consists only of the two parts, RMB 9 and ROS 11. This drawing symbolizes that the RICH coupler 5 is always a workable unit even with an unused SCS.

Figure 10:
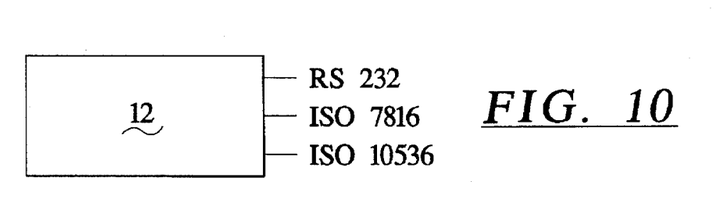
FIG. 10 illustrates the connections on a RICH mechanic plug of the present invention.

FIG. 10 illustrates the standardized connection elements of the RICH mechanic plug 12. An RS 232 connection provides the serial connection to the card level, especially for the card PC. The ISO 7816 provides for connections to a card mechanic for cards with contacts and the ISO 10536 does the same for contactless cards. This RICH mechanic plug 12 is a standardized element which is ready to connect directly to a standardized card physical interface 8 on the side of the card mechanic 4 (See FIG. 5).

Figure 11:
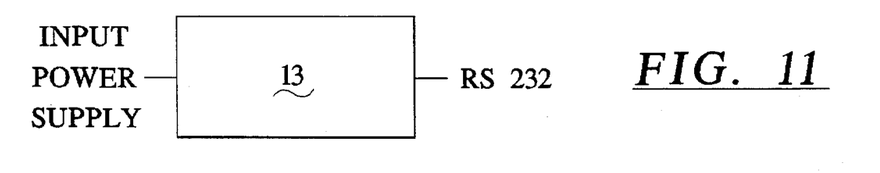
FIG. 11 illustrates the connections of a RICH system plug of the present invention.

FIG. 11 illustrates the standardized elements of a RICH system plug 13, the RS 232 provides the connection to the RICH system level, especially for the RICH system PC 20. Separated from the RS 232 connection, the RICH coupler 5 has a power connection for getting power for its own requirements and to serve for a mechanic card system.

As disclosed above, FIGS. 1,2,3 and 4 illustrate that a coupling between the card (card level) and the external world (system level) could be solved by a special device, i.e. a RICH coupler 5 operating on the intermediate coupler level. This coupler contains all the requirements which are necessary for connecting the card level and the system level.

To more easily understand the description of the present invention, it is useful to take a point of view from a position intermediate between the card level and the system level (see FIG. 3). This intermediate point of view differs from the usual point of view that a system developer prefers. The point of view of a system developer is usually inside the developer's system, i.e. inside the terminal.

It is obvious that there has to be a direct physical connection which could establish a bidirectional signal flow for communication use between the card and the external world. In FIG. 2, the symbol⇆is used to indicate that necessary connection. The ISO 7816 describes contacts positioned on the surface of a card and describes the electrical connection and the protocol for communication between the card and the external world. Most of today's system developers use this description for their system layout. The ISO card description is used by device and system developers to determine their special device and system card interfaces. The result is that a system or device developer takes the standardized ISO card contact requirements from the card level into the system level. Thus, the exact timing of the ground, power and clock connections to the different card contacts are prepared on the system level. In addition, the clock frequency which is needed by the electronics in the card is provided on the system level. The physical connection of a contactless card is more subtle and is described in the part 3 of the ISO 10536. The contactless card requires that a system developer recognize more requirements for card connections.

The separation between the card and the external world gives no hint as to which system, card or external world, would test the proper workability of the other system. It leads to confusion if a terminal produces the decision whether a card would work relative to the standards. The opposite situation produces no better situation. In both cases the test device could bear the fault. Thus, the tested system of the present invention has produced the right answer to the insufficient working testing system.

This situation becomes more important if MACs are used. Because of the many unforeseen applications a MAC can serve, different new programs would arise in the external world. If there is no intermediate test between card and external world then the cards in the field become the test criteria for the new applications and the programs.

One method to avoid the above-mentioned problems is described herein and discloses using an intermediate hardware and software device known as a coupler situated between the card and the external world. This coupler could work like a filter between the card and the external world and can produce tests for the card and the external world.

The present invention is capable of solving the above-mentioned problems. The invention can test the condition on the system level side. For example, the invention can test the physical and logical consistencies of protocols which are coming in from the system level. Also, the invention can send test protocols to the system level and control the feedback from the system level. In addition, the present invention can simulate a card level for use on the system level.

Further, the invention is capable of testing the condition on the card level side. For example, the present invention can test the physical and logical consistencies of protocols which are coming in from the card level; send test protocols to the card level and control the feedback from the card level; and simulate the system level for use on the card level. The invention can also provide power for the card level and an indication light for showing the unsatisfactory operation of a system component.

The RICH coupler, which is positioned between the card level and the system level, is characterized by its function between these levels. The system level is usually named "terminal" or "external world" and sometimes "system" in the ISO-papers. In the present invention the system level is defined as a card level independent device which is prepared to interact with cards. For example, the card level independent devices are devices like encipher-, fax- or cash-devices.

The three distinguishable parts of a coupler are the RICH mechanic board (RMB), the RICH operating system (ROS) and the specific card server (SCS). FIG. 6 shows a simplified performance of this three devices. For working activities of a RICH coupler, the RMB and the ROS are necessary devices. The SCS is an optional device which is utilized for the special card applications. FIG. 9 shows a RICH coupler 5 with an unused SCS-connection.

FIG. 7 illustrates the six elements of the RMB: RICH mechanic plug 12, RICH system plug 13, ROS and SCS connection holes 14, RICH test plug 15, RICH data plug 16 and RICH power plug 17. A description for these elements follows.

The RICH mechanic plug 12 provides for the connection to the card level which is usually the card mechanic 4. The functions of a card mechanic 4 are shown in FIG. 5. The elements of a RICH mechanic plug 12 are listed in FIG. 10. The RICH mechanic plug 12 is a standardized element which accommodates cards with contacts as described in the ISO 7816 and contactless cards as described in the ISO 10536. The RICH mechanic plug 12 could use some special connection pins for special requirements like a card hold function for indicating the position of the card.

The RICH system plug 13 provides for the connection to the system level. The elements are listed in FIG. 11. The ROS and SCS connection holes 14 are prepared holes into which the connection pins of the ROS and the SCS could be plugged. The RICH test plug 15 and the RICH data plug 16 are standardized serial RS 232 connections. The RICH power plug 17 contains the input power supply which is necessary for the working activities of the RICH coupler 5. It is obvious that the power must be sufficient also for card level requirements.

Inside the RICH mechanic board 9 are embedded RMB connection wires 18. This electrical wire network serves for the pre-determined and correct connection of the different parts of a RICH coupler 5. It is clearly described that the connection of the different parts of a RICH coupler 5, especially between the card level and the system level, could only take place in the specific manner determined by the wired connection of the network. For example, an SCS is connected by the RMB connection wires 18 to the card level and/or the system level. Because of this embedded hard-wired connection, the RICH coupler activities are controlled by the ROS.

The ROS is determined in its activities by the RICH software (RSW). The open description of the RSW operation allows a different user of the ROS to prepare its own card application in harmonization to the RSW. One special activity of the RSW is to simulate the card protocols and card-functions of the card level. Thus, the RSW simulates the requirements in the field of a real working card. Because of this, an ROS containing the RSW can work like a real working card. Thus, it can be used like a reference to a system level. Alternatively, a ROS simulates the field requirements of a real working system. Likewise because of this, a ROS can be used as a reference (terminal reference) to the card level.

Because of this function of the RICH coupler 5, it is useful to speak of a reference for card harmonization. For example, a card issuer can test the functions of its card by the RICH coupler 5 which simulates the system level. Also, a device manufacturer can test the function of its terminal by the RICH coupler 5 which simulates the card level. Cards or devices, which when tested independently by using a RICH coupler, work together are RICH-compatible.

The ROS contains a function indication light or a display panel. This element indicates the function status of an ROS without being connected to an external PC. The RICH coupler replicates a card for the requirements of the system level and replicates a terminal for the requirements of the card level.

To make sure that independently developed MAC card programs and independently developed MAC terminals work faultlessly together, it is necessary that they use a harmonized MAC command set (MCCS). The RICH coupler contains an MCCS. This MCCS could be transmitted by a standardized PC connection to any PC by using a specific transmit command. The developer of a new card or terminal could use the MCCS for development. The MCCS could be coded using a higher level programming language, for example, the programming language "C". Therefore, it is clear that the developer could transcribe the C-MCCS-Code into a specific processor code by using a compiler. Because of this transmission and transcription of MCCS software, it is assured that the correct command set for MACs is provided. For example, the specific command for deleting an application file on the MAC has the standardized name "DELETE FILE" and is stored in the MCCS. An RSW contains an executable object file of the command "DELETE FILE" which can be compiled, assembled and linked in the usual manner from a C language file. This file can be completely stored in the MCCS and transmitted to the PC connection by using a specific and open RICH command. The developer can create a mask for a new MAC controller by using a C-language file of the command "DELETE FILE" and can build up a controller-specific compiler, assembler and linker. Thus, the right standardized MAC commands can penetrate the market in the same way the RICH coupler penetrates the market. Upgraded versions of MCCS could be marketed and it could be assured by the provider of the "RICH philosophy" that there is always a compatible MCCS version in the market.

It is obvious that an RSW which internally uses all the required instructions for MAC use can analyze the incoming instructions from the system level. Further, it can produce a description of the differences between incoming and stored instructions. Also an ROS can be used like a command filter to transmit only the instructions between the card level and the system level which comply with the MCCS.

An SCS prepares the real working card application. All the requirements of a specific card application are fulfilled by an SCS. For example, an SCS fulfills all the requirements of an application provider for the card holder to store data on a card. The identification of the memory location on the card needs a special application provider number in the SCS. A specific program in the SCS is needed for the manipulation of the data in the card for operations like adding, booking, etc. Because an ROS is an application independent system, the SCS has to fulfill all the application-specific requirements. Therefore, the wired network of the RMB is prepared to connect the different parts of the RICH coupler, especially an SCS for transmitting bidirectional data between system level and card level. By using a plugged-in SCS with a specific card serving program, a RICH coupler can be used like a terminal in the field. The SCS software provides for the real multiapplication, and the RSW works like a supervisor of the actions between card level and system level.

An SCS contains specific security data and processes like enciphering because data security and secured card handling is the responsibility of the application. It is obvious that an ROS because of its functions, and other hardware can be used, to send test patterns to their usual outputs and can analyze the response coming in.

Although other modifications and changes may be suggested by those skilled in the art, it is the intention of the inventor to embody within the patent warranted hereon all changes and modifications as reasonably and properly come within the scope of his contribution to the art.

I claim:

1. A coupling apparatus for physical and communication activities between a card level and a system level, wherein the card level is a standardized technical environment produced by an integrated circuit card and wherein the system level is a standardized technical environment produced by a card level independent device which is prepared to interact with the card level, said coupling apparatus comprising a mechanic board and an operating system and further wherein the coupling apparatus transmits a test to either the system level or the card level.

2. A coupling apparatus according to claim 1, wherein said mechanic board comprises:

a mechanic plug, a system plug, a plurality of operating system and specific card-server connection holes, a test plug, a data plug, and a power plug, all of which are connected by an electrical network so that said operating system controls logical communication activities in the network and between the card level and the system level.

3. A coupling apparatus according to claim 2, further comprising a specific card server (SCS) plugged into SCS connection holes, said SCS containing application specific software requirements for specific card applications, said requirements including transmitting bidirectional data between the system level and the card level; and wherein said mechanic board electrical network connects the operating system and the specific card-server and the components of the mechanic board to enable the coupling apparatus to perform like an actual electronic terminal to a card.

4. A coupling apparatus according to claim 1, wherein said operating system further comprises a display panel to indicate an operational status and fault status of the operating system.

5. A coupling apparatus according to claim 1, further comprising a standardized connection for communication with a personal computer, wherein said coupling apparatus transmits, by a specific command, a stored set of standardized multiapplication card commands for multiapplication card activity and a multiapplication card terminal and also transmits the stored programs for executing the multiapplication card command set in a high-level programming language to an external personal computer.

6. A coupling apparatus according to claim 5, wherein said standardized connection is an RS 232 connection.

7. A method for coupling a card level and a system level, comprising the steps of:

providing a coupling apparatus having a mechanic board and an operating system; and operating said operating system with built-in and open-described instruction set software and a standardized multiapplication card command set, said software simulating card protocols and card functions of the card level for test requirements of the system level, and said software further simulating system protocols and system functions of the system level for test requirements of the card level so that said operating system using said software can be used as a reference to a real card level device or a system level device.

8. A method for coupling a card level and a system level, comprising the steps of:

providing a coupling apparatus having an operating system and a mechanic board having a standardized connection for communication with a personal computer;

transmitting, by a specific command, a stored set of standardized multiapplication card commands for multiapplication card activity from the coupler to the personal computer and wherein a multiapplication card terminal uses said operating system; and transmitting stored programs for executing the multiapplication card command set in a high-level programming language to the personal computer.

9. A method for coupling a card level and a system level, comprising the steps of:

providing a coupling apparatus having a mechanic board and an operating system; and providing a specific card server (SCS) plugged into connection holes of said mechanic board, said SCS containing application specific software requirements for specific card applications, said requirements including transmitting bidirectional data between the system level and the card level; and wherein a mechanic board network connects the operating system and the specific card server and the components of the mechanic board to enable the coupling apparatus to perform like an actual electronic terminal to a card.

10. A coupling apparatus for physical and communication activities between a card level and a system level, wherein the card level is a standardized technical environment produced by an integrated circuit card and wherein the system level is a standardized technical environment produced by a card level independent device which is prepared to interact with the card level, said coupling apparatus comprising a mechanic board and an operating system having a function indicator to indicate an operational status and fault status of said operating system, wherein the coupling apparatus transmits a test to either the system level or the card level.

11. A coupling apparatus for physical and communication activities between a card level and a system level, wherein the card level is a standardized technical environment produced by an integrated circuit card and wherein the system level is a standardized technical environment produced by a card level independent device which is prepared to interact with the card level, said coupling apparatus comprising a mechanic board and an operating system, wherein said operating system operates with built-in and open described instruction set software and contains a standardized multiapplication card command set, and wherein said software can simulate card protocols and card functions of the card level for test requirements of the system level, and said software further simulates system protocols and system functions of the system level for test requirements of the card level so that said operating system using said software can be used as a reference to a real card level device or a system level device.

12. A coupling apparatus for physical and communication activities between a card level and a system level, wherein the card level is a standardized technical environment produced by an integrated circuit card and wherein the system level is a standardized technical environment produced by a card level independent device which is prepared to interact with the card level, said coupling apparatus comprising a mechanic board and an operating system, wherein said operating system operates with built-in and open described instruction set software and contains a standardized multiapplication card command set, and wherein said software can simulate card protocols and card functions of the card level for test requirements of the system level, and said software further simulates system protocols and system functions of the system level for test requirements of the card level so that said operating system using said software can be used as a reference to a real card level device or a system level device; and wherein said operating system includes means for interpreting and analyzing instructions coming in by protocol transmission from the system level or the card level and wherein said software detects differences relative to the multiapplication card command set and produces a description of the differences.

13. A coupling apparatus for physical and communication activities between a card level and a system level, wherein the card level is a standardized technical environment produced by an integrated circuit card and wherein the system level is a standardized technical environment produced by a card level independent device which is prepared to interact with the card level, said coupling apparatus comprising a mechanic board and an operating system, wherein said operating system operates with built-in and open described instruction set software and contains a standardized multiapplication card command set, and wherein said software can simulate card protocols and card functions of the card level for test requirements of the system level, and said software further simulates system protocols and system functions of the system level for test requirements of the card level so that said operating system using said software can be used as a reference to a real card level device or a system level device; and     wherein said operating system further comprises means for transmitting only instructions from the system level to the card level that satisfy all the requirements and standardization of the multiapplication card command set.

14. A coupling apparatus for physical and communication activities between a card level and a system level, wherein the card level is a standardized technical environment produced by an integrated circuit card and wherein the system level is a standardized technical environment produced by a card level independent device which is prepared to interact with the card level, said coupling apparatus comprising a mechanic board and an operating system, wherein said operating system operates with built-in and open described instruction set software and contains a standardized multiapplication card command set, and wherein said software can simulate card protocols and card functions of the card level for test requirements of the system level, and said software further simulates system protocols and system functions of the system level for test requirements of the card level so that said operating system using said software can be used as a reference to a real card level device or a system level device;

wherein said operating system further comprises means for producing a standardized protocol test pattern output;

means for providing said standardized protocol test pattern output to said mechanic board; and     means for analyzing feedback protocols coming in from said mechanic board in response to said produced output.

15. A coupling apparatus for physical and communication activities between a card level and a system level, wherein the card level is a standardized technical environment produced by an integrated circuit card and wherein the system level is a standardized technical environment produced by a card level independent device which is prepared to interact with the card level, said coupling apparatus comprising a mechanic board and an operating system, wherein said operating system operates with built-in and open described instruction set software and contains a standardized multiapplication card command set, and wherein said software can simulate card protocols and card functions of the card level for test requirements of the system level, and said software further simulates system protocols and system functions of the system level for test requirements of the card level so that said operating system using said software can be used as a reference to a real card level device or a system level device;

wherein said operating system further comprises means for producing standardized multiapplication card commands as test instructions;

means for sending an output responsive to said test instructions to said mechanic board; and     means for analyzing feedback protocols coming in from said mechanic board in response to said produced output.

16. A method for coupling a card level and a system level, comprising the steps of:

providing a coupling apparatus having a mechanic board and an operating system;

operating said operating system with built-in and open-described instruction set software and a standardized multiapplication card command set, said software simulating card protocols and card functions of the card level for test requirements of the system level, and said software further simulating system protocols and system functions of the system level for test requirements of the card level so that said operating system using said software can be used as a reference to a real card level device or a system level device;

said operating system interpreting and analyzing instructions coming in by protocol transmission from the system level or the card level;

said software detecting differences relative to the multiapplication card command set; and     producing a description of the differences.

17. A method for coupling a card level and a system level, comprising the steps of:

providing a coupling apparatus having a mechanic board and an operating system;

operating said operating system with built-in and open-described instruction set software and a standardized multiapplication card command set, said software simulating card protocols and card functions of the card level for test requirements of the system level, and said software further simulating system protocols and system functions of the system level for test requirements of the card level so that said operating system using said software can be used as a reference to a real card level device or a system level device; and     said operating system transmitting instructions from the system level to the card level that satisfy all the requirements and standardization of the multiapplication card command set.

18. A method for coupling a card level and a system level, comprising the steps of:

providing a coupling apparatus having a mechanic board and an operating system;

operating said operating system with built-in and open-described instruction set software and a standardized multiapplication card command set, said software simulating card protocols and card functions of the card level for test requirements of the system level, and said software further simulating system protocols and system functions of the system level for test requirements of the card level so that said operating system using said software can be used as a reference to a real card level device or a system level device; and     said operating system producing a standardized protocol test pattern output;

providing said standardized protocol test pattern output to said mechanic board; and     analyzing feedback protocols coming in from said mechanic board in response to said produced output.

19. A method for coupling a card level and a system level, comprising the steps of:

providing a coupling apparatus having a mechanic board and an operating system;

operating said operating system with built-in and open-described instruction set software and a standardized multiapplication card command set, said software simulating card protocols and card functions of the card level for test requirements of the system level, and said software further simulating system protocols and system functions of the system level for test requirements of the card level so that said operating system using said software can be used as a reference to a real card level device or a system level device; and said operating system producing standardized multiapplication card commands as test instructions;

sending an output responsive to said test instructions to said mechanic board; and analyzing feedback protocols coming in from said mechanic board in response to said output.

* * * * *